US008996531B1

(12) United States Patent
Sacco

(10) Patent No.: US 8,996,531 B1
(45) Date of Patent: Mar. 31, 2015

(54) INVERTED INDEX AND INVERTED LIST PROCESS FOR STORING AND RETRIEVING INFORMATION

(76) Inventor: Giovanni M Sacco, Turin (IT)

( * ) Notice: Subject to any disclaimer, the term of this patent is extended or adjusted under 35 U.S.C. 154(b) by 581 days.

(21) Appl. No.: 13/026,850

(22) Filed: Feb. 14, 2011

Related U.S. Application Data

(63) Continuation-in-part of application No. 12/880,129, filed on Sep. 12, 2010, now Pat. No. 8,566,324.

(51) Int. Cl.
*G06F 7/00* (2006.01)
*G06F 17/30* (2006.01)
*G06F 12/00* (2006.01)
*G06F 17/00* (2006.01)

(52) U.S. Cl.
CPC ................................... *G06F 12/00* (2013.01)
USPC ........................... 707/741; 707/742; 707/752

(58) Field of Classification Search
CPC ..................... G06F 17/30946; G06F 17/3002
USPC ............ 707/742, 999.001–999.005, 741, 752
See application file for complete search history.

(56) References Cited

U.S. PATENT DOCUMENTS

| | | | |
|---|---|---|---|
| 4,606,002 A * | 8/1986 | Waisman et al. | 707/999.003 |
| 5,704,060 A | 12/1997 | Del Monte | |
| 5,852,822 A * | 12/1998 | Srinivasan et al. | 1/1 |
| 5,884,276 A * | 3/1999 | Zhu et al. | 705/7.12 |
| 5,940,833 A | 8/1999 | Benson | |
| 6,055,526 A | 4/2000 | Ambroziak | |
| 6,460,047 B1 | 10/2002 | Ambroziak | |
| 7,149,748 B1 | 12/2006 | Stephan | |
| 7,487,141 B1 * | 2/2009 | Stephan | 707/999.003 |
| 2002/0091715 A1 * | 7/2002 | Coady | 707/200 |
| 2007/0198621 A1 * | 8/2007 | Lumsdaine et al. | 708/200 |
| 2008/0133565 A1 * | 6/2008 | Yasuda et al. | 707/101 |
| 2009/0313238 A1 * | 12/2009 | Merrigan et al. | 707/5 |

OTHER PUBLICATIONS

Vo Ngoc Anh , Alistair Moffat, Inverted Index Compression Using Word-Aligned Binary Codes, Information Retrieval, v.8 n. 1, p. 151-166, Jan. 2005.*
Sergey Melnik , Sriram Raghavan , Beverly Yang , Hector Garcia-Molina, Building a distributed full-text index for the Web, Proceedings of the 10th international conference on World Wide Web, p. 396-406, May 1-5, 2001.*
A. Moffat et al, "Self-Indexing Inverted Files for Fast Text Retrieval," ACM Transactions on Information Systems 14, 4 (Oct. 1996), pp. 349-379.
H. Bast et al., "Type Less, Find More: Fast Autocompletion Search with a Succinct Index," In Proceedings of the 29th Annual International ACM SIGIR Conference on Research and Development in Information Retrieval, Aug. 6-11, 2006, pp. 364-371.
T. Yasuda et al "Device and Method for Constructing Inverted Indexes," Nov. 7, 2007, U.S. Appl. No. 11/936,277.
Capon J., A probabilistic model for run-length coding of pictures, IEEE Transactions on Information Theory, 1959.
Elias, P., Universal codeword sets and representation of the integers, IEEE Transactions on Information Theory IT-21 (2):194-203, Mar. 1975.
Zobel, J. and Moffat, A. 2006. Inverted files for text search engines. ACM Comput. Surv. 38, 2.

* cited by examiner

*Primary Examiner* — Kannan Shanmugasundaram
(74) *Attorney, Agent, or Firm* — Clifford H. Kraft

(57) ABSTRACT

A process is disclosed for the computer management of inverted lists and inverted indices, in which the standard representation and processing of inverted lists is changed in order to achieve a simpler, more compact and more efficient architecture.

9 Claims, No Drawings

INVERTED INDEX AND INVERTED LIST PROCESS FOR STORING AND RETRIEVING INFORMATION

This is a continuation in part of Ser. No. 12/880,129, filed Sep. 12, 2010.

PRIOR ART

Capon J., A probabilistic model for run-length coding of pictures, IEEE Transactions on Information Theory, 1959

Elias, P., Universal codeword sets and representation of the integers, IEEE Transactions on Information Theory IT-21 (2):194-203, March 1975

Zobel, J. and Moffat, A. 2006. Inverted files for text search engines. *ACM Comput. Sun*). 38, 2

Bast, H. and Weber, I. 2006. Type less, find more: fast auto-completion search with a succinct index. In Proceedings of the 29th Annual international ACM SIGIR Conference on Research and Development in information Retrieval (Seattle, Wash., USA, Aug. 6-11, 2006). SIGIR '06. ACM, New York, N.Y., 364-371.

Tomohiro Yasuda et al, Device and method for constructing inverted indexes, U.S. application Ser. No. 11/936,277, Nov. 7, 2007

Wolfgang Stephan, Expanded inverted index, U.S. Pat. No. 7,149,748, Dec. 12, 2006.

Max Benson, Compressing sets of integers, U.S. Pat. No. 5,940,833, Aug. 17, 1999.

BACKGROUND OF THE INVENTION

An inverted list $<K_j, \{p[0], \ldots, p[i], \ldots, p[N-1]\}>$ is a data structure that stores a mapping from a key $K_j$ (such as, for instance, a database key or a query term) to a list of one or more pointers $p_i$ to objects in a structured, semi-structured or unstructured database. In structured databases, where the key consists of a database key composed of one or more attributes, the list contains the logical or physical pointers to the records containing the database key. As an example, let the database key be the attribute Color for a relation Car. The inverted list for Color=red contains the logical or physical pointers to all the records in the Car relation for which the attribute Color has the value red. A physical pointer is an address to a specific location, whereas a logical pointer is a unique object identifier that can be mapped to a physical location by some translation mechanism. As an example, a logical pointer to a database record can be a unique identifier assigned by the system (typically an increasing integer number) that is mapped to a physical location by a translation table.

Inverted lists are used in many information technology applications. In addition to structured databases, an important application area is text retrieval. In this context, the key represents a term (or, usually, a unique term identifier) and the list enumerates all the documents (usually represented by unique identifiers) in the collection containing that term. Another important area is represented by dynamic taxonomies (Sacco, G., Dynamic taxonomy process for browsing and retrieving information in large heterogeneous data bases, U.S. Pat. No. 6,763,349, U.S. Pat. No. 7,340,451) where the deep extension of concepts (i.e. the set of objects classified under a concept or one of its descendants) can be represented by inverted lists, where the key is a concept identifier and the list includes all the identifiers for the objects in the deep extension of that concept.

The key in an inverted list may be of variable size. The list is often kept ordered because this allows to perform list operations such as intersection, union, subtraction, etc. (which implement boolean operations on keys) in linear time.

Inverted lists are stored in inverted indices, which allow quick access to the inverted list corresponding to a search key. Such inverted indices are stored in computer memory, and generally on secondary storage. They are usually organized as B-trees or variations (Comer, D. The Ubiquitous B-Tree. ACM Computing. Surveys, 11, 2 (June 1979), 121-137; Bayer, R. and Unterauer, K. 1977. Prefix B-trees. ACM Trans. Database Syst. 2, 1 (March 1977), 11-26). These structures order records in such a way that the physical order of records in the file is the same as the logical order of the index keys. In this present case, the records inserted in the index are the inverted lists, and index keys are the inverted list keys. Indices are usually organized into fixed-size pages, a page being the minimum access unit.

Inverted lists and inverted indices present several problems. First, for large information bases or information bases with a non-uniform distribution of keys, many inverted lists may contain a large number of pointers, and, in general, span several pages. It is quite difficult and expensive to perform insertions and deletions in these cases, if the pointers in the inverted list are to be maintained ordered so that list operations can be performed in a linear time.

Another problem of inverted lists and inverted indices is the space required by these structures. In naïve implementations, the overhead of these structures can be so large as to be impractical for large applications. For instance, in text-retrieval applications, the size of the inverted index can be as large as or larger than the size of of the indexed text corpus.

Finally, even if a linear time is required for list operations on sorted lists, list operations can be too expensive in very large applications.

SUMMARY OF THE INVENTION

The invention described in the following changes the standard representation of inverted lists in several ways in order to achieve a simpler, more compact and a more efficient architecture. In particular, a normalized inverted list structure is presented, in which the inverted list $<K_j, \{p[0], \ldots, p[i], \ldots, p[N-1]\}>$ is represented by N records containing its constituent pairs $<K_j, p[k]>$, $0 \leq k \leq N-1$. This representation makes insertions and deletions in an ordered inverted list considerably simpler, because such operations are performed by record insertion/deletion operations on the inverted index. In order to avoid the space overhead incurred by storing the inverted list key in each record, a prefix compression can be used. In prefix compression, the records in each page are stored sequentially according to the key logical order, and the prefix of a record which is the same as the prefix of the previous record is factored out. Since prefix compression usually requires a larger computational effort to search for a specific key, efficient evaluation methods are introduced.

The normalized inverted lists structure is extended to efficiently represent contiguous intervals of pointer values. This extension allows a more compact representation of large lists, and, most importantly, list operations which are sublinear with respect to the number of pointers in the lists.

Finally, the normalized inverted lists structure is extended to efficiently represent sparse intervals of pointer values, through uncompressed or compressed bitmaps. The length of the interval can be represented explicitly by a field in a record or implicitly with respect to the following record. The sublinear evaluation for contiguous interval of pointer values can be adapted to sparse intervals.

Although, as noted, inverted indices are usually organized as B-trees or variations, the present invention can be easily extended to different index structures.

DESCRIPTION OF PREFERRED EMBODIMENTS

All the methods and the operations described here are performed on a computer. The first change made to the standard inverted list representation is called normalization and transforms a single inverted list <$K_j$, {$p[0]$, . . . , $p[i]$, . . . , $p[N-1]$}> of length N, where $K_j$ is the key and {$p[0]$, . . . , $p[i]$, . . . , $p[N-1]$} is the list, into N pairs <$K_j$, $p[0]$> to <$K_j$, $p[N-1]$>. Each pair <$K_j$, $p[i]$> is a record. In terms of the relational model, the primary key of the relation storing the normalized list is the pair <$K_j$, $p[i]$>, i.e., there cannot be two records with the same inverted list key and pointer in the relation.

In order to access the entire normalized inverted list, a prefix scan is implemented. The prefix scan for a search key K' uses the index to access the first record <$K_j$, $p[0]$>, with $K_j$=K' (K' is the prefix of the record to be found). Subsequently, it performs a sequential scan fetching all the subsequent records with $K_j$=K', until a record with K1>K' or the end of file is encountered. In order to simplify prefix scans, normalized list data (including the list key) are usually stored in such a way as to maintain lexicographic order in byte-by-byte comparisons, although this is not a requirement of the present invention. In particular, numeric data and pointers are usually stored in big-endian order, i.e., the most significant byte is stored first. Dates are usually stored in year-month-day format, and strings as null-terminated character sequences. In the following, it is assumed for expediency that each character is stored in a single byte, but this is not a requirement and an arbitrary number of bytes can be used to store each character.

An advantage of using a normalized architecture is that the ordering of the inverted list is performed by the inverted index itself (an index that guarantees a physical order matching the logical orders of keys, such as B-trees or variations, is assumed). An additional advantage is that very long lists do not pose any challenge because they are represented as a set of small records, instead of a single record. Inverted lists are difficult to implement in the standard single-record architecture because they usually require a main memory space equal to the size of the list, and complex allocation strategies if the list cannot be entirely stored into a single page.

Of course, these advantages are paid in terms of additional space required, as the key K is not factored out, but it is repeated in each pair. This problem can be overcome by using a prefix compression in the inverted index. Prefix compression encodes as an integer the number of bytes of the current record which are a common prefix with respect to the previous record in the same page. The common prefix is not stored. The first record in a page has a 0 common prefix as there is no previous record in the same page. As an example, assume that we have record ABCD followed by record ABZQ. The length of the common prefix is 2 and only the suffix ZQ of record ABZQ is stored. As we note below, the length of the common prefix 2 may be explicitly stored in some descriptor. For simplicity, a prefix compression on bytes is assumed in the following. However, different compression units composed by chunks of n bits can be used in practice.

By compressing the common prefix of consecutive records, the overhead of the key in each pair is eliminated at the slight expense of storing the encoded common prefix. In addition, the prefix compression will usually compress a significant part of the pointer, which is stored in big-endian byte order (i.e., the most significant byte value is stored at the memory location with the lowest address, the next byte value in significance is stored at the following memory location and so on). Finally, prefix compression will also compress the common prefix of two different consecutive keys.

The common prefix length may be stored in a descriptor which can be used to store the record length as well. The record length is the length of the suffix, after the common prefix is removed. The record length needs to be explicitly stored only for variable-length records. The descriptor generally uses an integral number of bytes, but different storage units can be used. In addition, different representations for the compression information can be used.

It must be noted that, although we associate each pointer to its key, we can more generally associate a chunk of j pointers to their key. That is, the ordered list of N pointers is partitioned into ceiling(N/j) chunks, and each chunk is stored together with the inverted list key. The chunk size j represents the maximum number of pointers that can be stored inside a chunk. Therefore, the actual number of pointers in each chunk may be stored in the record descriptor. Prefix compression can be used. Insertion and deletion operations can be implemented by splitting, balancing, and recombining chunks in a way similar to the same operations on B-trees. Thus, on insertion of pointer p, the appropriate chunk is located. If the chunk is not full (i.e. the number of pointers is less than j), then the pointer is inserted in the appropriate sorted position in the chunk. Otherwise, the chunk is split into two ordered chunks, and insertion in the appropriate chunk is performed. Similarly, on deletion, the pointer is simply deleted if the number of pointers is larger than a predefined quantity. Otherwise, after deletion, the current chunk is combined with the previous or following chunk, if possible. If recombination is not possible, then rebalancing with an adjacent chunk may be performed, where pointers from the other chunk are transferred to the current underflow chunk.

Prefix compression will now be discussed. Although the present context is inverted lists, the methods in the following apply to the storage and retrieval of any type of record (including data records) with prefix compression. Prefix compression requires that records in a page are accessed and stored in primary key order, and makes the location of a requested record in a page a sequential process. In fact, a stored record can only be reconstructed, in the general case, through the previous records. The normal process of locating a search key K' of length N bytes (for strings, N may include the null string terminator) in a page starts from the first record in the page which, by definition, is not compressed and has a common prefix length equal to 0. A variable P is kept which stores the previous record in the page (P is initially null). The records in the page are scanned sequentially, and each record is decompressed by storing in P the suffix of the current record at an offset equal to the common prefix length. Once the original record is reconstructed, the search key is compared with the normalized inverted list key and a match is found if the first N bytes of both keys are the same.

Although we assume, for simplicity, a complete record decompression, it should be noted that in practice the maximum common prefix length L is a predefined quantity, and only L bytes are compressed for longer common prefixes. Consequently, only a maximum of L bytes need to be decompressed.

More efficient implementations can be used. Assume that the search routine is only required to return the decompressed normalized inverted list record or null, if the record is not found. The required record can be more efficiently located in the following way. Initially set P to the first record in the page. Compare the search key with the key of that record. If they match, return P. Otherwise, let D be the first byte that is different between the two keys. On the subsequent forward scan, all records with a common prefix equal to or larger than D can be simply ignored and not even decompressed. If the common prefix is smaller than D−1, then the search can be stopped because the record requested cannot be found. If the common prefix is equal to D−1, then the record can be decompressed using P as the previous record, and the search key compared with the record. If they match, return P. Otherwise, recompute D and iterate. If the end of the current page is found without locating the search key, then the record requested is not found.

In some cases, for instance when a new record needs to be inserted, the largest key smaller than the search key (or the smallest key larger than the search key, in other cases) must be returned, if the search key is not found. In general, this requires the normal iterative decompression process. The method presented here avoids record decompression by using the efficient implementation described above and keeping pointers to the minimum set of records required for decompression after the search has completed.

Assume that we want to return the largest key smaller than the search key whenever the search key is not found. A stack is kept during the search. Each stack element is a pair <slength, spointer> where spointer is the pointer to a record, and slength is the length of the prefix of spointer in common with the previous record. Initially, the stack contains the element <0, sp>, where sp is the pointer to the first record in the page. Each record r accessed during the forward scan is pushed into the stack as the element <slength(r), spointer(r)>. However, before inserting the record at the top of the stack, the current element tp=<slength(tp), spointer(tp)> at the top of the stack is iteratively removed if slength(r)≤slength(tp). These elements are, in fact, useless for reconstructing the final record.

If the common prefix of the current record is smaller than D−1, then the record is not found. The element corresponding to the current record is not pushed into the stack. The stack is processed from the bottom of the stack to the top. Let N the number of elements in the stack, 1<i<N be the current element, i+1 the next one, and KL(k) be the common prefix length of record k with respect to record k−1. Let R be the result record, an array of bytes with initial index at 0, initially empty. For each i, copy KL(i+1)−KL(i) bytes of the suffix of record i at the KL(i) position in R. For the top of the stack (i=N), copy the record suffix at the KL(N)+1 position in R.

This method can be easily modified in order to return the smallest key larger than the search key, or to use a different data structure, as long as the minimum set of records required for decompression is retained.

In order to improve the performance of sequential scans, a cursor can be maintained for each active scan. The cursor stores the current decompressed record, and its position in the page. Accessing the next record in the page only requires decompressing the next record using the current decompressed record. The cursor may be made invalid by insertion and deletion operations.

Significant deviations from uniformity can occur for key distributions. As an example, the distribution of words in a collection of documents is known to follow a Zipf's law. This implies that a large number of words will appear only once in the corpus. In these frequent cases, prefix compression will only work on the common prefix of two different subsequent keys, but no compression will occur for pointers. It can be therefore beneficial to use a different compression scheme for pointers. A bit prefix can be used to indicate the number of non empty prefix bit-chunks (the bit-chunk unit is usually the byte) in the pointer, which is stored in big-endian order. As an example, let pointers be defined on 4 bytes. The first (most significant) two bits in the pointer indicate the complement of the number of zero bytes in the prefix. A maximum of 3 bytes is considered, because 4 zero bytes occur only when the value of the pointer is zero, an event that can be ignored for compression. So, if the pointer is equal to 1 and has therefore three zero bytes in the prefix, a single byte with the first two bits set to the complement of 3, that is 0, will be used. The complement is used to maintain the lexicographic order in the key. This technique is easily extended to pointer sizes equal to n, for which the bit encoding requires ceiling(log 2 n) bits. Null-prefix encoding can be stored in the pointer itself, or factored out and stored elsewhere. Although it was applied to pointers, it can be applied to any integer or floating point field.

As the size of an inverted list grows, so does the probability that contiguous pointers will be found. Two pointers are defined contiguous if the absolute value of their difference is equal to a predefined constant d (usually d=1). In some applications, such as notably dynamic taxonomies, the topmost concept includes by definition all the objects in the collection, so that all the logical pointers (object identifiers) in the list are contiguous. Although contiguous pointers are efficiently compressed by prefix compression, a different representation can achieve a better compression and, at the same time, a more efficient evaluation of list operations. Thus a normalized entry is no longer a pair <Kj, p[i]> but a triple <Kj, p[i], delta[i]>, where delta[i] is the length of a run of contiguous pointers and consequently delta[i]=0 if the next pointer p[i+1] is not contiguous to p[i]. The primary key is the pair <Kj, p[i]>, meaning that there are no pairs with duplicate values in the inverted index. We call this type of representation "interval normalized representation".

Since non-uniform key distributions make one-element lists relatively frequent, space requirements for one-element lists should be minimized. In order to minimize the overhead caused by a small or null delta, delta can be compressed by dropping (i.e. not storing) the most significant zero bytes of delta. Such a compression makes the record of variable length, and either the length of the record, or the length of the dropped suffix may be encoded in the record descriptor. Delta can also be represented in small-endian (i.e., the least significant byte value is at the lowest address; the other bytes follow in increasing order of significance) and compressing it by dropping its zero-byte suffix. In both cases, a delta which is equal to 0 is not stored and requires no space overhead. Among other alternatives, delta can also be represented by Elias's codes. If delta is equal to 0, it does not need to be stored.

In addition to a more efficient data compression, interval representation allows list operations that have a sublinear complexity in the number of pointers in the list. We describe intersection, union and subtraction operations. Extensions to other operations are easily done by persons with ordinary skill in the art.

Unless otherwise stated, operations are on N lists, and each list i has a current cursor C[i] whose component C[i].pos identifies the current position in the ordered list of records, and whose component C[i].cont represents a range of contiguous pointers in the form <ps, pe>, where ps identifies the first pointer in the range and pe the last pointer in the range. C[i].cont is set when the current record (identified by C[i].pos) is read and it is derived from the current record <K, p, delta>, where p is the first pointer in the range, and delta is the length of the interval of contiguous pointers, by setting ps=p and pe=ps+delta.

The access structure in which the lists are stored allows to advance the current cursor to the next pointer, ps+1. If ps+1>pe, then the next record is fetched and C[i] set accordingly. If the next record in the inverted list representation does not exist, an end-of-scan condition is raised and processing for the list is terminated. The access structure also allows to advance the current cursor to a value x. If x≤C[i].cont.pe, the cursor is not advanced, and C[i].cont.ps is set to x if C[i].cont.ps≤x (C[i].cont.ps is not changed otherwise). If x>C[i].cont.pe, the cursor is advanced to the next record until C[i].cont.ps≤x≤C[i].cont.pe (if C[i].cont.ps<x, then C[i].cont.ps is set to x). If the next record in the inverted list representation does not exist, an end-of-scan condition is raised and the processing for the list is terminated.

The following functions and operations, like all the operations described in this application, can be carried out on a computer, and these functions can be visualized as flowcharts to be executed on the computer.

Intersection

At each step, let minp be the minimum pe for all the cursors and maxp be the maximum ps for all the cursors.

If minp≥maxp, then output <maxp, minp> and advance each cursor to minp+1, recomputing minp and maxp. Otherwise, advance the cursor with the minimum pe to maxp, recomputing maxp and minp.

In both cases, iterate until a cursor raises the end-of-scan condition during advancing.

Union

Create a data structure V that keeps the cursors ordered by increasing ps.

Let W be the element in V with the lowest ps.

Initialize the current output CO to W.cont, advance the cursor in W and update V.

Iteratively check W.

If W.cont.ps≤CO.pe+1, then set CO.pe to max(CO.pe, W.pe). Otherwise, output CO, and set CO to W.cont. In both cases, advance the cursor in W, update V and iterate.

If a cursor raises the end-of-scan condition during advancing, eliminate it from V. The process terminates when all the cursors have raised the end-of-scan condition and have been eliminated; CO is output.

Subtraction

Let A and B be two interval inverted lists, and the expression to be computed be A−B.

Let Unload(A) be a procedure that appends to the output all the elements in A from the current cursor to the end.

At each step, CA.cont.ps and CB.cont.ps are compared:

if CB.cont.ps<CA.cont.ps, CB is advanced to CA.cont.ps. If this causes an end-of-scan condition, then Unload(A) is called and the process terminates, otherwise the process iterates.

if CB.cont.ps=CA.cont.ps, let w be the minimum value between CA.cont.pe+1 and CB.cont.pe+1. CA is advanced to w; if this causes an end-of-scan condition then the process terminates. CB is advanced to w. If this causes an end-of-scan condition, then Unload(A) is called and the process terminates, otherwise the process iterates.

if CB.cont.ps >CA.cont.ps:

if CB.cont.ps >CA.cont.pe, output CA.cont, and advance CA to the next element; if this causes an end-of-scan condition then the process terminates else output <CA.cont.ps, CB.cont.ps−1> and if(CB.cont.pe≤CA.cont.pe) CA is advanced to CB.cont.pe+1, if this causes an end-of-scan condition then the process terminates; CB is advanced to the next element, if this causes an end-of-scan condition, then Unload(A) is called and the process terminates. Otherwise, the process iterates.

else CA is advanced to the next element, if this causes an end-of-scan condition then the process terminates; CB is advanced to CA.cont.pe+1, if this causes an end-of-scan condition, then Unload(A) is called and the process terminates. Otherwise, the process iterates.

Additional compression can be achieved by coding intervals that are not completely filled by a pair <p, bitmap>, where p indicates the first pointer in the interval, and bitmap is a bitmap of length N, where bit k is set if and only if the pointer p+k (1≤k≤N) belongs to the inverted list. For performance reasons, N is usually a multiple of an octet or of a computer word, though this is not required. In this case, an inverted list record is represented by a triple <Kj, p[i], bitmap[i]> and the primary key is the pair <Kj, p[i]>, meaning that there are no pairs with duplicate values in the inverted index. We call this type of representation a "partial uncompressed bitmapped normalized representation".

The bitmap used in a partial uncompressed bitmapped representation can be compressed by several methods. As an example, the bitmap can be represented by a bit string where the gaps between successive pointers are coded by Elias' δ or γ codes (Elias, 1975). The length of such bitmap can be stored as the δ or δ coded prefix of the bitmap, or stored inside the record descriptor, or a combination of the two schemes can be used where the total byte length is coded in the descriptor, and the number of bits used in the last byte is coded in the prefix of the bitmap. Another compression method is run-length encoding which codes the sequences of contiguous 0's or 1's in the bitmap (Capon, 1959). We call these types of representation a "partial compressed bitmapped normalized representation".

Partial uncompressed or compressed bitmapped normalized representations can explicitly represent the interval they are describing by adding an explicit delta field as in the interval normalized inverted list representation. In this case, an inverted list record is represented by a quadruple <Kj, p[i], delta[i], bitmap[i]> and the primary key is the pair <Kj, p[i]>, meaning that there are no pairs with duplicate values in the inverted index. In the case of bitmaps whose gaps are encoded (e.g., through Elias' δ or γ codes), delta[i] can be coded in the same way. Obviously, if the last pointer in the bitmap is represented by p[i]+delta[i], there is no need to represent it explicitly in the bitmap.

In general, but especially when a partial compressed (e.g., by Elias's codes) bitmap is used, the first pointer in the interval can be encoded (e.g., by Elias's codes). In addition, it can be represented by the difference with the first pointer in the previous record (or 0 if no such record exists in the page), and possibly encoded (e.g., by Elias's codes). This requires that the correct pointer value is reconstructed during prefix decompression.

Insertion and deletion operations on bitmapped representations can be implemented by splitting, balancing, and recombining partial bitmapped representations in a way similar to the same operations on B-trees, as described above for chunks of pointers.

We call a "hybrid normalized inverted list", an inverted list where the inverted list can be stored as records represented by a normalized representation (e.g., <Kj, p[i]>), or by an interval normalized representation (e.g., <Kj, p[i], delta[i]>) or by a partial compressed or uncompressed bitmapped representation (e.g., <Kj, p[i], bitmap[i]>), possibly with an explicit indication of the interval delta[i]. In a hybrid normalized inverted list, some type of indicator can be used to discriminate among admissible representations, if more than one is used. As an example, such a discrimination can be achieved by a specific bit field in the descriptor, but other strategies can be implemented. As in the case of the interval representation, also in the case of the partial bitmapped representation a variable-length record may be beneficial and is generally used. If a variable-length record is used, the length of each record must be stored (for example, in a record descriptor). The maximum record length determines the maximum bitmap length.

As an additional variant, the bitmap representation can be used to represent sparse intervals that contain (or are) contiguous intervals. As an example, if the gaps of the bitmap are compressed by Elias coding, a run of contiguous values can be encoded by its length prefixed by an encoded 1. On decoding, when 1 is encountered as a gap, the following number is taken as a run of contiguous values. The leading 1 code changes the meaning of the following code only.

When inserting or updating an inverted list, the most efficient storage representation for each record in the list will generally be used. Performance of list operations may also be taken into account in the selection of the representation, so that the choice may be more biased towards interval representations.

A partial bitmapped representation can be easily integrated in the list operations described above by simply having its cursor return, during the operation, the ordered set of pointers that it represents. Intervals of contiguous values can be represented implicitly through an interval normalized representation, or explicitly as an ordered set of pointers.

A more efficient way is to exploit the interval over which a bitmapped representation is defined. In the present case, we may have a mix of list records described by interval representations, and lists described by compressed or uncompressed bitmapped representations. Each bitmapped representation describe an interval ranging from $p[i]$ to the last pointer in the interval, which can be explicitly represented by the last bit set in an uncompressed representation or by $p[i]+delta[i]$ in a compressed representation with explicit delta stored or implicitly by $p[i+1]-1$, that is the first pointer in the next chunk minus 1 if there is a successive record in the list, or the maximum integer value if there is not.

The intervals described by bitmapped representations are sparse intervals, in which not all the values in the interval are guaranteed to exist, rather than the full intervals described by interval representations, in which all values in the interval exist. Whereas operations, such as intersection, on full intervals produce a full interval that can be directly output, operations which include at least one sparse interval produce a "candidate interval" that must be explicitly computed. For instance, if we intersect two full intervals [10, 15] and [7, 12], the result is the full interval[10, 12] and all the values in this interval belong to the result. However, if we intersect the following two intervals A:[10, 15] and B:[7, 12], where A is a full interval and B is a sparse interval containing {7, 11, 12}, the resulting interval[10, 12], is a "candidate" interval, in the sense that not all the values inside it are guaranteed to belong to the result. This means that the lists representing partial intervals need to be intersected among them and with the candidate interval, e.g. [10, 12], considered as a full interval; in the example, the result is {11, 12}. In the following, we discuss how the intersection of several inverted lists can be performed, by a simple modification of the algorithm discussed above.

We assume that the cursor for a bitmapped representation enumerates the existing values in the compressed or uncompressed bitmap in an ordered way. On advancing the current cursor to the next pointer and on moving the current cursor to a specific pointer, only existing pointers will be considered. In this way, ps will always contain an existing pointer of the sparse interval.

If the last pointer in the interval represented by the current record is available (either explicitly or implicitly), the operation of moving the current cursor to a specific pointer P can be optimized by iteratively comparing P with said last pointer, and advancing to the next record if P is larger than said last pointer. If P is smaller than or equal to the said last pointer, ps will be set to P. In this way, all the irrelevant coded pointers in the record can be immediately discarded without further processing.

Intersection

At each step, let minp be the minimum pe for all the cursors and maxp be the maximum ps for all the cursors.

If minp≥maxp, then output the intersection of the bitmapped representations in the interval <maxp, minp> and advance each cursor to minp+1, recomputing minp and maxp. Otherwise, advance the cursor with the minimum pe to maxp, recomputing maxp and minp.

In both cases, iterate until a cursor raises the end-of-scan condition during advancing.

The same strategy can be easily extended to union and subtraction.

The operation of advancing (moving) the cursor with the minimum pe to maxp, indicated above, can be replaced by the operation of advancing all cursors to maxp, since pointers whose value is smaller than maxp do not belong to the result. This strategy can also be applied to the intersection of contiguous intervals discussed above. The computation of new minp and maxp can be done while moving all cursors to maxp. A new value for maxp produced by a cursor movement can be used by subsequent cursor movements in the same operation.

The computation can also be organized as a while loop that repeats while minp<maxp and none of the cursors reaches its end-of-scan condition. Inside the loop, cursors are advanced to the current maxp and update the current maxp and/or minp values; cursors are selected for advancing sequentially modulo the number of cursors.

In some cases, additional data needs to be associated to each entry. As an example, in text retrieval applications, one might want to maintain the frequency information for a term t for each document in which t appears. In this case, the frequency information will be added to each pair in normalized representations. The record for a normalized representation will then be a triple <Kj, p[i], a[i]>, where a[i] is the additional information, and <Kj, p[i]> is still the primary key of the relation storing the list, i.e., no two pairs with same value exist in the file. In the case of a normalized interval representation and of a compressed or uncompressed representation, a number of different additional values must be stored for the existing pointers in the interval. These additional values can be stored as an additional field in the same record, or represented as a pair <ptr, additional_value> in compressed bitmapped representations. In both cases, it can be beneficial to compress such additional values (e.g., by Elias' codes).

As a concrete example of the benefits of the above methods and without any loss of generality, consider search engines. As mentioned above, search engines are usually based on inverted lists as a method to store and efficiently retrieve information. The methods presented here compress inverted lists in such a way that space requirements for inverted lists significantly decrease, with a consequent decrease of secondary storage space and of cost of access to secondary devices.

Although compression generally requires a computational overhead to decompress data, the current methods support a much faster execution of the principal operations, which coupled with the methods described above to speed decompression up, result in significant execution time benefits. Hence, for a given set of documents and query workload, fewer or less powerful machines are required to support a given level of service. This results in very significant savings not only in costs of ownership, but also in operating costs such as energy costs.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the methods can be applied to other search and data management applications.

Those of skill would further appreciate that the various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computer described herein may be any kind of computer, either general purpose, or some specific purpose computer such as a workstation, or any organization of computers interconnected by whatever means and locally or geographically distributed. The computer may also be a server or a server farm implementing a website. The computer may be programmed by any programming language. Secondary storage defines generic storage devices (including main memory) that maintain information that the computer can access, and may use any type of technology for this purpose.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. The method of using a computer to represent each inverted list record in a database, said inverted list record containing a key and a list of one or more ordered logical or physical pointers associated with said key, the number of said pointers being n, said method comprising:

using the computer for subdividing said inverted list into m ordered groups of pointers, each group containing at least one pointer, and m being smaller than or equal to n; representing each said group by a record that includes the key of said inverted list record followed by said group of pointers, said record called a chunk record, the group of pointers within a chunk record being called the value of said chunk record, the pointer with the smallest value in the group being called the lowest pointer, the pointer with the largest value in the group being called the highest pointer, each chunk record being stored in an index structure organized by pages, the term index data record being used to denote any chunk record in the database, and implementing a prefix compression among the multiple index data records by identifying a common prefix part between a current index data record to be compressed and a previous index data record, said common prefix part denotes storage units that are equal in the current index data record and the previous index data record, starting with the first storage unit of the current index data record and the previous index data record;

wherein said common prefix part is empty if the index data record to be compressed is a first index data record in the page; and where said prefix compression compresses the current index data record by storing only a length in storage units of the common prefix part, and not storing an actual content of the common prefix part, where said index data record does not use any pointers to address other index data records or any data from the inverted list record said index record represents;

where all data from any inverted list record are entirely stored in the index structure and not in any external overflow areas;

where the value of said index data record does not include any keys;

allowing the sequential read of the pointers in an inverted list through a cursor C with a component C.pos identifying the current chunk record in the ordered list of chunk records, and a component C.cont representing a group of pointers in the form <ps,pe>, where C.cont.ps identifies the lowest pointer and C.cont.pe the highest pointer in the group, C.cont being set when the current chunk record identified by C.pos is read and being derived from the current chunk record by setting C.cont.ps=p and C.cont.pe=ps+delta, where p is the lowest pointer in the group, and delta is the length of the interval of contiguous or sparse pointers, said delta being explicitly stored or estimated, and further characterized by an operation of advancing the cursor to the next pointer wherein:

if the current pointer C.cont.ps is not the last pointer in the current chunk record, C.cont.ps is set to the next pointer in the current chunk record, if the current pointer C.cont.ps is the last pointer in the current chunk record, the next chunk record in the inverted list is read, if said chunk record does not exist an end-of-scan condition being returned.

2. The method of claim 1 where a group of pointers with contiguous values is represented by a single chunk record containing the key of said inverted list, a lowest pointer in the group, said lowest pointer being compressed or uncompressed, and the difference between the highest pointer in the group and the lowest pointer in the group.

3. The method of claim 2 where said difference is non compressed, or compressed.

4. The method of claim 1 where a group of pointers is represented by a single chunk record containing the key of said inverted list, a lowest pointer in the group, said lowest pointer being compressed or uncompressed, and represented by a bitmap of length N, said length being variable in such a way that different groups can have bitmaps with different lengths, the i-th bit of said bitmap, where i>I and i pointers such that its value is equal to the lowest pointer value in the group incremented by i.

5. The method of claim 1 where a group of N pointers is represented by a single chunk record containing the key of said inverted list, a lowest pointer in the group, said lowest pointer being compressed or uncompressed, and a compressed representation of the set of pointers from which the lowest pointer is excluded, said N being variable in such a way that different groups can have a different number of pointers.

6. The method of claim 1, in which the difference between the highest pointer and the lowest pointer in the group of pointers is explicitly represented, in each chunk record, said difference being compressed or uncompressed, said highest pointer in the interval being excluded from the set of pointers represented by the group of pointers.

7. The method of claim 1 further characterized by an operation that advances said cursor C to a value x wherein: while x>C.cont.pe, the cursor is advanced to the next chunk record, if x if C.cont.ps, or all the curs ors; b. if minp>maxp then compute the intersection among the lists in the interval and advance each cursor to minp+I, otherwise advance each cursor to maxp, iterate in both cases steps a and b until any cursor returns an end-of-scan condition during advancing; wherein:

if no cursor is defined on a sparse interval, the output of the intersection in the interval is given by all the values in said interval; otherwise, the output of the intersection in the interval is computed by ignoring all the cursors defined on a contiguous interval, and outputting all the values in the interval that appear in all the cursors.

8. The method of claim 7 further comprising computing the intersection of N inverted lists, said intersection consisting of only those pointers that appear in all the lists, each list J having a cursor C[J], by the following steps:
  a. compute minp as the minimum value of C[J].cont.pe for all the cursors and maxp as the maximum value of C[J].cont.ps for all the cursors;
  b. if minp≥maxp then compute the intersection among the lists in the interval <maxp, minp> and advance each cursor to minp+1, otherwise advance each cursor to maxp, iterate in both cases steps a and b until any cursor returns an end-of-scan condition during advancing;
wherein:
if no cursor is defined on a sparse interval, the output of the intersection in the interval <maxp, minp> is given by all the values in said interval;
otherwise, the output of the intersection in the interval <maxp, minp> is computed by ignoring all the cursors defined on a contiguous interval, and outputting all the values in the interval <maxp, minp> that appear in all the cursors.

9. The method of claim 1 where additional data can be associated to each pointer, said data being compressed or uncompressed.

* * * * *